(12) United States Patent
Ferrari de Goes et al.

(10) Patent No.: US 11,727,616 B2
(45) Date of Patent: Aug. 15, 2023

(54) CONTOUR LINES FOR VOLUMETRIC OBJECTS

(71) Applicant: Pixar, Emeryville, CA (US)

(72) Inventors: Fernando Ferrari de Goes, Kensington, CA (US); Junyi Ling, San Francisco, CA (US); George Binh Hiep Nguyen, Oakland, CA (US); Markus Heinz Kranzler, Alameda, CA (US)

(73) Assignee: PIXAR, Emeryville, CA (US)

( * ) Notice: Subject to any disclaimer, the term of this patent is extended or adjusted under 35 U.S.C. 154(b) by 94 days.

(21) Appl. No.: 17/512,378

(22) Filed: Oct. 27, 2021

(65) Prior Publication Data

US 2023/0125292 A1 Apr. 27, 2023

(51) Int. Cl.

| | | |
|---|---|---|
| *G06T 13/20* | (2011.01) | |
| *G06T 17/20* | (2006.01) | |
| *G06T 15/08* | (2011.01) | |
| *G06T 15/04* | (2011.01) | |
| *G06T 15/06* | (2011.01) | |

(52) U.S. Cl.
CPC .............. *G06T 13/20* (2013.01); *G06T 15/04* (2013.01); *G06T 15/06* (2013.01); *G06T 15/08* (2013.01); *G06T 17/205* (2013.01)

(58) Field of Classification Search
CPC ......... G06T 13/20; G06T 15/04; G06T 15/06; G06T 15/08; G06T 17/205
See application file for complete search history.

(56) References Cited

U.S. PATENT DOCUMENTS

| | | | | |
|---|---|---|---|---|
| 2003/0222875 | A1* | 12/2003 | Kawakami | ............. G06T 15/02 345/473 |
| 2009/0153578 | A1* | 6/2009 | Kim | ....................... G06T 15/02 345/582 |
| 2010/0194863 | A1* | 8/2010 | Lopes | ...................... G06T 7/12 715/848 |

(Continued)

OTHER PUBLICATIONS

Benard et al., "Computing Smooth Surface Contours with Accurate Topology", ACM Transactions on Graphics, vol. 33, No. 3, Mar. 2014, pp. 1-20.

(Continued)

*Primary Examiner* — Phuc N Doan
(74) *Attorney, Agent, or Firm* — Kilpatrick Townsend & Stockton LLP

(57) ABSTRACT

Systems and methods automatically generate contours on an illustrated object for performing an animation. Contour lines are generated on the surface of the object according to criteria related to the shape of the surface of the object. Points of the contour lines that are occluded from a virtual camera are identified. The occluded points are removed to generate visible lines. The visible lines are extruded to define a three-dimensional volume defining contours of the object. The object itself, along with the three-dimensional volume, are illuminated and rendered. The parameters defining the opacity and color of the contour may differ from corresponding parameters of the rest of the object, so that the contours stand out and define portions of the object. The contours are useful in contexts such as defining areas of an object that is fuzzy or cloudy in appearance, as well as creating certain artistic effects.

20 Claims, 16 Drawing Sheets

(56) References Cited

U.S. PATENT DOCUMENTS

| | | | |
|---|---|---|---|
| 2012/0147008 A1* | 6/2012 | Lin | G06T 15/20 345/427 |
| 2016/0257077 A1* | 9/2016 | Brown | G06T 19/20 |
| 2017/0132836 A1* | 5/2017 | Iverson | G06T 17/10 |
| 2019/0325646 A1* | 10/2019 | Wong | G06T 17/20 |
| 2022/0366653 A1* | 11/2022 | Sung | G06T 7/73 |

OTHER PUBLICATIONS

Bénard et al., "Line Drawings From 3D Models: A Tutorial", Available Online at: https://arxiv.org/pdf/1810.01175.pdf, May 13, 2019, pp. 1-126.

Catmull et al., "Recursively Generated B-Spline Surfaces on Arbitrary Topological Meshes", Seminal graphics: pioneering efforts that shaped the field, vol. 10, No. 6, Jul. 1978, pp. 183-188.

Coleman et al., "Making Souls: Methods and a Pipeline for Volumetric Characters", SIGGRAPH '20: ACM SIGGRAPH 2020 Talks, Article No. 28, Aug. 17, 2020, 2 pages.

Fong et al., "Production Volume Rendering", SIGGRAPH '17: ACM SIGGRAPH 2017 Courses, Jul. 2017, 97 pages.

Halstead et al., "Efficient, Fair Interpolation using Catmull-Clark Surfaces", SIGGRAPH '93: Proceedings of the 20th annual conference on Computer graphics and interactive techniques,, Sep. 1993, 11 pages.

Pekerman et al., "Self-Intersection Detection and Elimination in Freeform Curves and Surfaces", Computer-Aided Design, vol. 40, No. 2, Feb. 2008, pp. 150-159.

* cited by examiner

CONTOUR LINES FOR VOLUMETRIC OBJECTS

BACKGROUND

With the widespread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Virtual objects can be sculpted much like real clay or plaster, working from general forms to specific details, for example, with various sculpting tools. Models may then be constructed, for example, out of geometrical vertices, faces, and edges in a 3D coordinate system to represent the virtual objects. These models can then be manipulated using computers to, for example, simulate physics, design aesthetic actions such as poses or other deformations, crate lighting, coloring and paint, or the like, of characters or other elements of a computer animation display.

One core functional aspect of computer graphics is to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects such as characters, props, backgrounds, or the like, as models to be used in the rendered image or animation sequence. In some instances, the geometric description of an object may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

In particular, there are situations where objects are not clearly defined. For example, certain objects have an opacity level or texture that is similar to a cloud, where a surface is not well-defined. In such instances, certain features of the objects cannot always be seen clearly as a result of illumination being a statistical process (e.g., light scattering may not always define an overlapping portion of an object clearly). In other cases, an artist may wish to create an artistic effect with line work on the object. Such line work can be a laborious task to manually replicate as the object moves in the animation process. Accordingly, there is a need to overcome the drawbacks and deficiencies in the art.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Systems, devices, and methods are provided for rendering volumetric objects with contours. As part of generating an animated object, an artist can automatically generate contours so as to define and provide a uniform look to the object, even when the object does not have a well-defined surface (e.g., like a cloud). Then, during animation, the rig of the object can be used to automatically move the object, and the contours can be automatically generated.

In some embodiments, a method for performing animation includes performing steps by a computer system including receiving a polygonal mesh defining a surface of an object. The computer system generates contour lines on the surface of the object according to one or more criteria. The computer system identifies one or more points of the contour lines that are occluded from a virtual camera. The computer system removes the one or more points from the contour lines, thereby generating visible lines. The computer system generates contour ribbons by extending the visible lines in a first direction relative to the virtual camera. The computer system extrudes faces of the contour ribbons in a second direction relative to the virtual camera, thereby generating a first three-dimensional volume. The computer system generates a texture for the surface of the object, the texture defining a second three-dimensional volume that has a density gradient. The computer system renders, using a virtual light source, the object by ray tracing between the virtual light source and the first three-dimensional volume and by ray tracing between the virtual light source and the second three-dimensional volume.

In some aspects, the contour lines are generated based on a location of the virtual camera relative to the object. In some aspects, the identifying a first point as occluded includes shifting the first point from the surface by a specified distance, tracing a ray from the first point to the virtual camera, and identifying the first point as occluded when the ray hits the surface of the object. In some aspects, the removing the one or more points from the contour lines generates contour fragments and the method further includes projecting the contour fragments onto a focal plane of the virtual camera and merging any contour fragments that are within a specified distance of each other.

In some aspects, the first direction is lateral relative to the virtual camera and the second direction defines a depth relative to the virtual camera. In some aspects, method includes tapering ends of the contour ribbons. In some aspects, the one or more criteria include one or more of identifying points on the surface of the object that have a surface normal perpendicular to a viewing vector or identifying points of self-intersection of the surface of the object.

In some aspects, the second three-dimensional volume is fuzzy and the first three-dimensional volume defines a shape of the second three-dimensional volume. In some aspects, identifying the one or more points of the contour lines as occluded includes identifying configured surface attributes.

In some aspects, the object is a character and the first three-dimensional volume defines body parts of the character.

These and other embodiments of the invention are described in detail below. For example, other embodiments are directed to systems, devices, and computer readable media associated with methods described herein.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Techniques are provided to automatically generate contours on an object for performing an animation. Contour lines can be automatically drawn according to certain criteria. Points of the contour lines that are occluded from a virtual camera can be identified. The occluded points can be removed to generate visible lines. The visible lines can be extruded to define a three-dimensional volume defining contours of the object. The object itself, along with the three-dimensional volume, can then be illuminated and rendered. The contours are useful in contexts such as defining areas of an object (e.g., if the object is cloudy or not opaque) and creating certain artistic effects (e.g., a halo effect). During animation, the rig of the character can be used to automatically move the character and the contour is automatically generated.

I. Example Volumetric Objects with Contours

Figure 1:
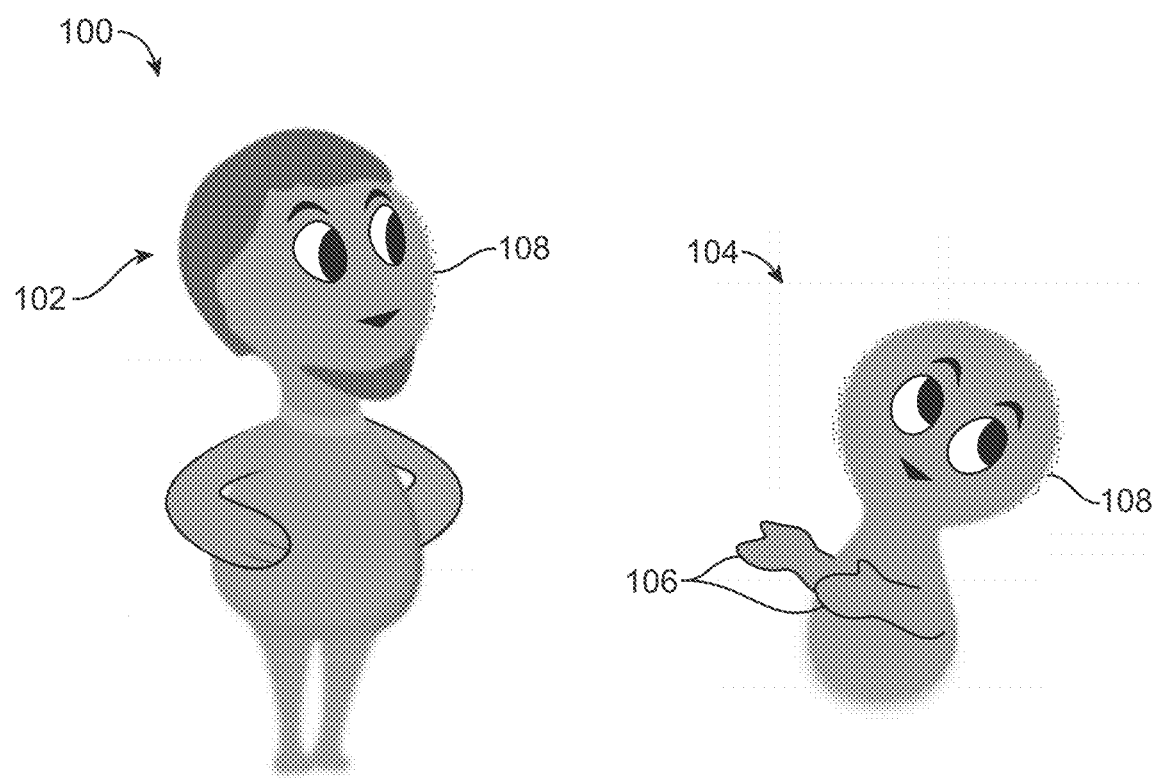
FIG. 1 is an illustration of volumetric objects with contours generated according to the techniques of the present disclosure.

FIG. 1 is an image 100 depicting examples of volumetric characters 102 and 104 with contours 106 and 108 generated according to the techniques of the present disclosure. The volumetric characters 102 and 104 are three-dimensional (3D) animated objects. As shown in FIG. 1, the volumetric characters 102 and 104 have a fuzzy appearance. Due to the fuzzy nature of the objects, the borders of the volumetric characters 102 and 104 are not clearly defined. For example, overlapping regions blend together due to the way the objects are rendered.

To better define the boundaries of different parts of the volumetric characters 102 and 104, contours 106 can be placed in strategic positions on or around the volumetric characters 102 and 104. As shown, contours 106 are placed around the hands of volumetric character 104, which helps define the hands and arms when overlapping other parts of the body. Contours 106 can also be placed around other regions for aesthetic purposes. For example, in the volumetric characters 102 and 104, contours 108 are placed around the face to provide a halo effect. Thus, the contours 106 and 108 can help define an object and/or provide an artistic effect.

II. Computer System for Contour Volume Modeling

Figure 2:
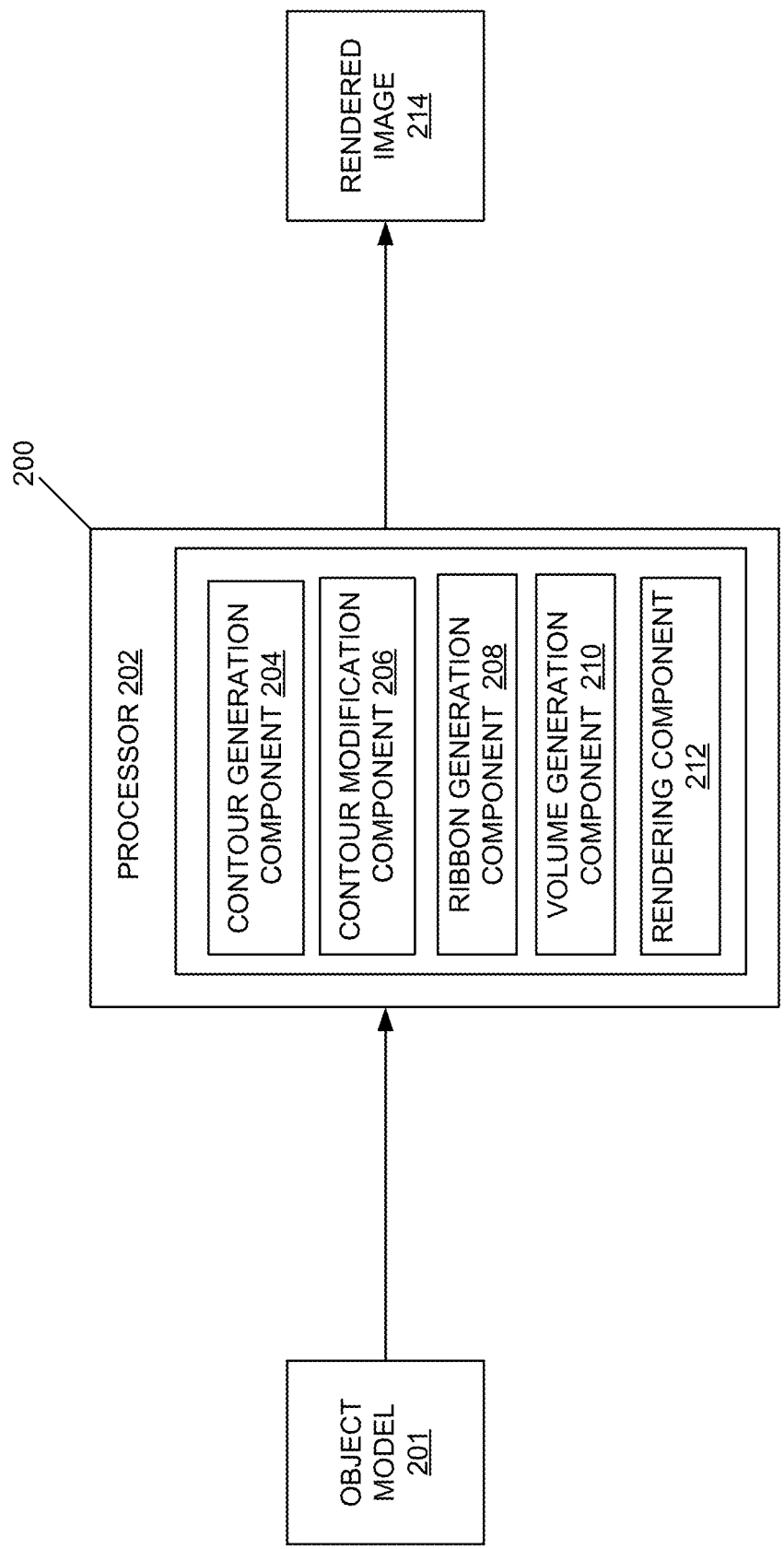
FIG. 2 is a simplified block diagram of a computer system for creating computer graphics imagery (CGI) and computer-aided animation that may implement or incorporate various embodiments or techniques for generating volumetric objects with contour volumes.
Figure 15:
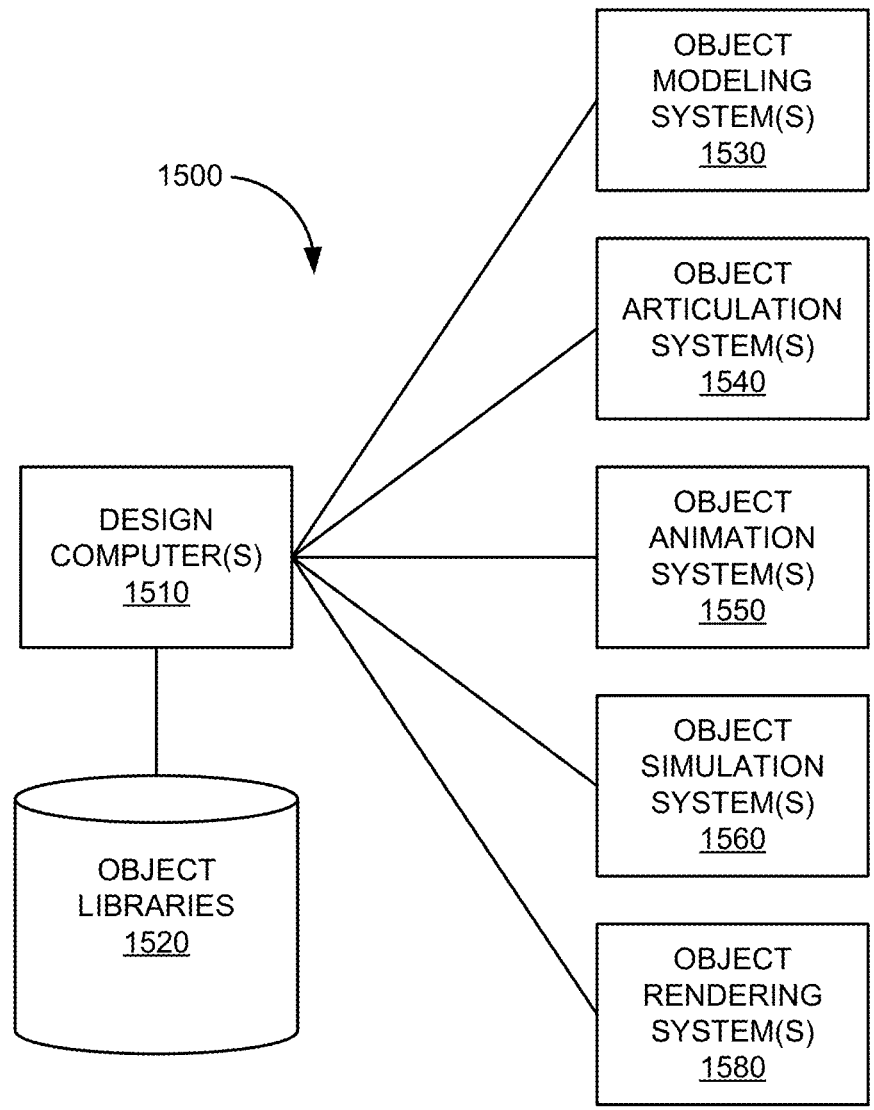
FIG. 15 is a simplified block diagram of a system for creating computer graphics imagery (CGI) and computer-aided animation that may implement or incorporate various embodiments of the present invention.
Figure 16:
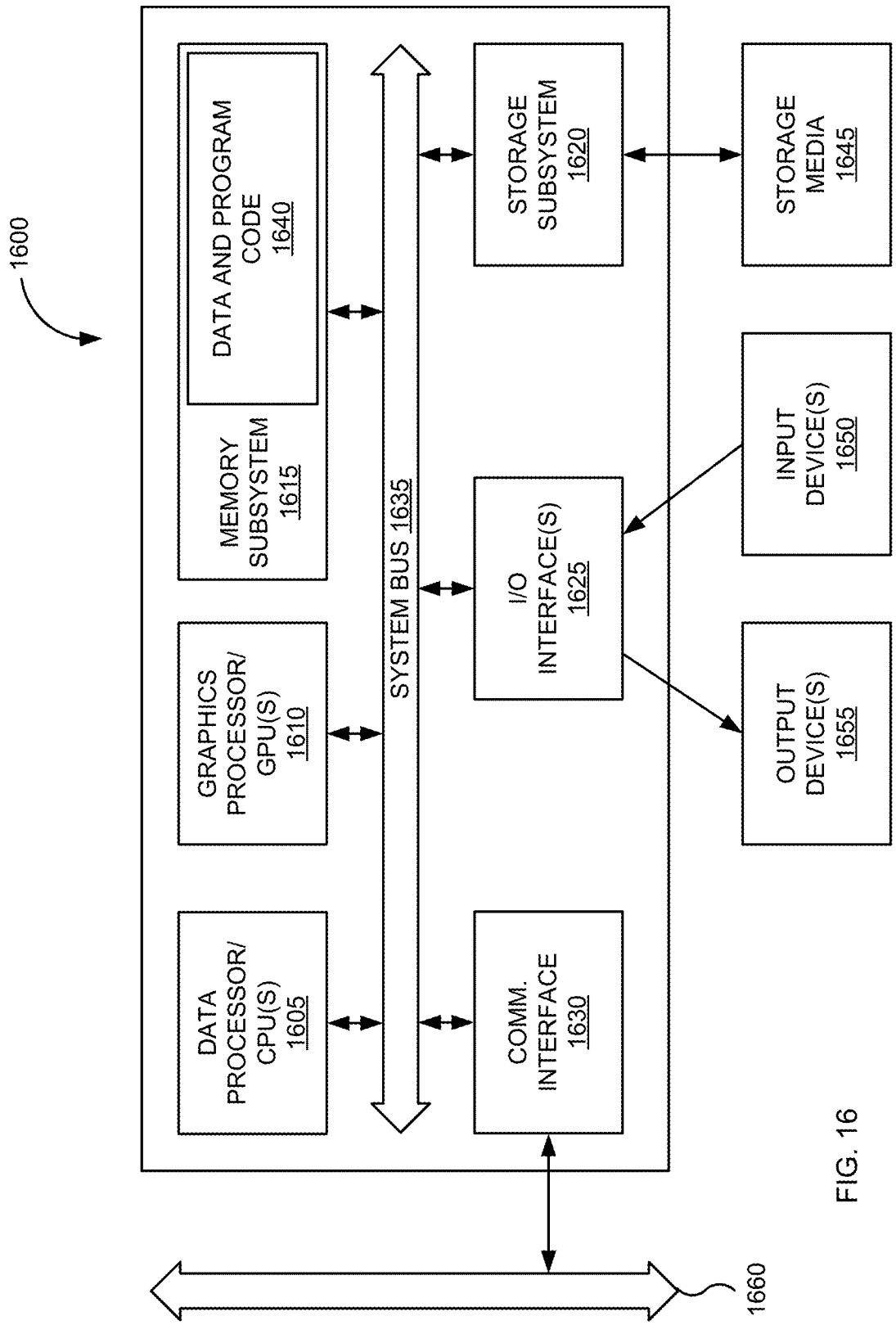
FIG. 16 is a block diagram of a computer system or information processing device that may incorporate an embodiment, be incorporated into an embodiment, or be used to practice any of the innovations, embodiments, and/or examples found within this disclosure.

FIG. 2 is a simplified block diagram of a computer system 200 for creating computer graphics imagery (CGI) and computer-aided animation including objects defined by contour volumes. As shown, the computer system 200 can include a processor 202 configured to implement computer program components, which can include a contour generation component 204, a contour modification component 206, a ribbon generation component 208, a volume generation component 210, and a rendering component 212. In some implementations, the computer system 200 is part of, or coupled to, systems for animating and rendering objects, as shown in FIGS. 15 and 16. The computer system 200 and its functions may accordingly be part of an overall animation pipeline as further described below with respect to FIGS. 15 and 16.

The processor 202 may receive as input an object model 201. The object model 201 can include a polygonal mesh defining a surface of an object. The object to be modeled can be a human or animal character or another object such as a car, a tree, a piece of furniture, etc. The object model 201 may be received from another component that is included in, or communicatively coupled to, the computer system 200

(e.g., the object modeling system 1530, as described in further detail below with respect to FIG. 15).

The contour generation component 204 can be configured to generate contours based on the received object model 201. The contour generation component 204 generates contour lines on the surface of the object according to one or more criteria. The criteria can include tracing contours along a surface based on a surface normal perpendicular to a viewing vector. Alternatively, or additionally, the criteria can include generating contours based on identified points of self-intersection of the surface of an object, or other suitable techniques.

The contour modification component 206 can be configured to modify contours as generated by the contour generation component 204. In some implementations, the contour modification component 206 modifies a contour by generating visible lines. Portions of the contour lines may or may not be visible based on the positioning of different parts of the object with respect to a virtual camera and light source. For example, in FIG. 1, the hands on the volumetric character 102 are not visible, and any contour lines on the hand area of volumetric character 102 are not visible from the virtual camera. The contour modification component 206 can identify visible lines by ray tracing from each point on a visible line towards a camera. If the ray hits a surface of the object or another object, then the point is flagged as occluded.

The contour modification component 206 may further modify the contour lines by defragmenting visible lines. In generating visible lines, the contour lines may be broken into contour fragments, as only certain portions of a given contour line are flagged as visible. The visible lines are defragmented based on a distance between the contour fragments. The defragmentation process can include projecting fragments to the camera canvas and determining a two-dimensional distance between the fragments. If the two-dimensional distance is less than a threshold, then the fragments are merged.

The ribbon generation component 208 can be configured to generate a two-dimensional ribbon along visible lines. Line segments can be duplicated along the defragmented visible lines produced by the contour modification component 206. The line segments can vary in length based on configured tapering parameters. The ribbon generation component 208 can connect the segments to create a flat ribbon. The ribbons are two dimensional thickened lines that extend through three-dimensional space. The ribbons may have artistic tapering effects.

The volume generation component 210 can be configured to generate three-dimensional volumes based on the two-dimensional ribbons generated by the ribbon generation component 208. The ribbons may be extruded based on density and tapering values of the ribbons. The volume generation component 210 may convert the extruded geometry into a volumetric density field.

The rendering component 212 can be configured to render a three-dimensional object with contour lines, according to the present disclosure. The rendering component 212 is configured to render or generate computer-generated images. In some aspects, the rendering component 212 may include, or be communicatively coupled to, the object rendering system(s) 1570 described below with respect to FIG. 15. As described below with respect to the object rendering system(s) 1570, a rendered image can be understood in terms of a number of visible features such as shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like. Based on these rendering parameters, the object is rendered using techniques such as ray tracing.

The rendering component 212 is configured to render an object with contour lines. In some embodiments, the object has some degree of transparency, translucency, and/or fogging. The contour lines may have different levels of reflectivity and transparency, to help define a translucent or foggy object. The rendering component 212 may apply different rendering parameters to the contour volumes and the rest of the object to create this effect, as described herein.

III. Methods for Generating and Rendering Contour Volumes

Figure 3:
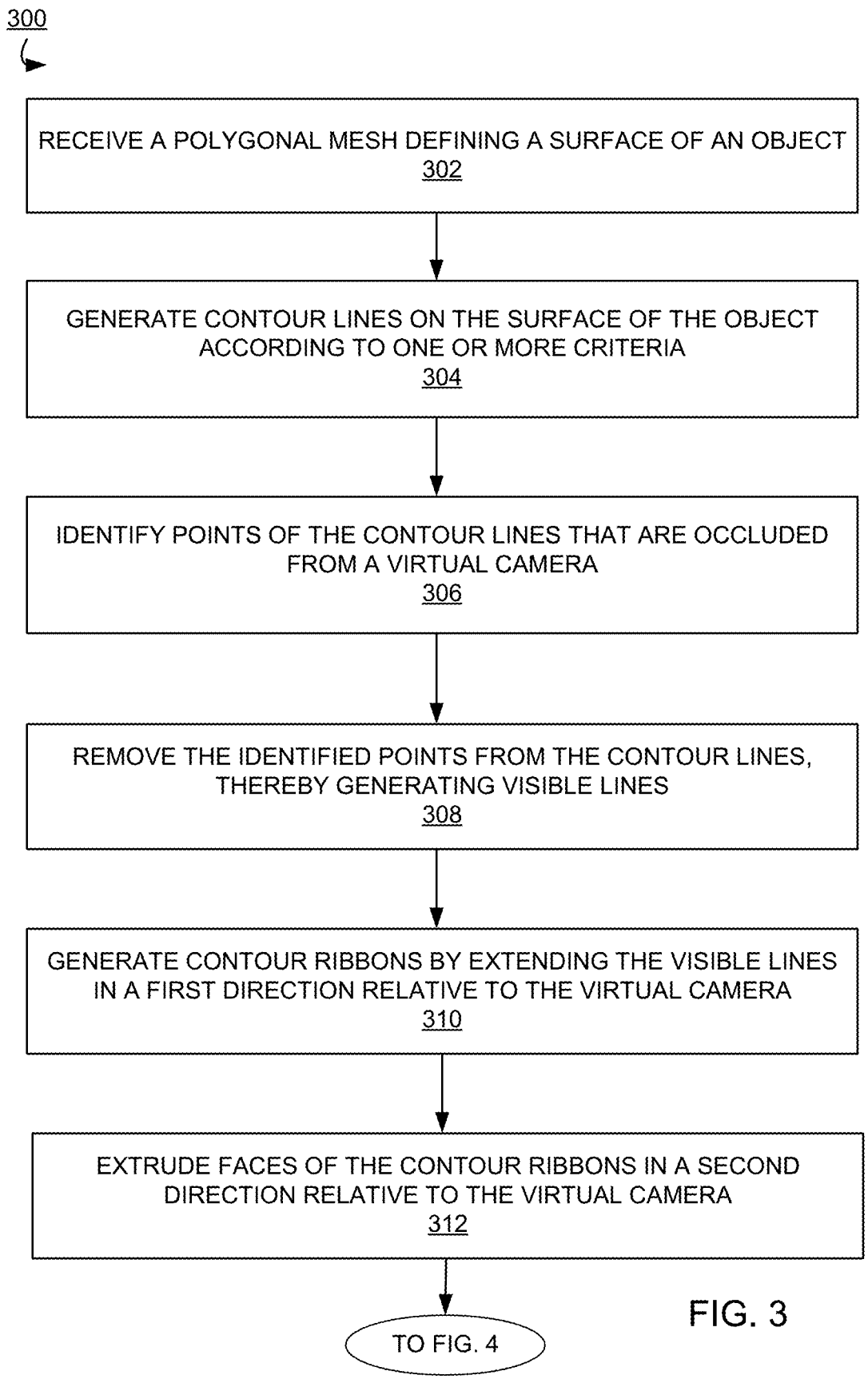
FIG. 3 is a simplified flowchart of a method for generating contours according to some embodiments.
Figure 4:
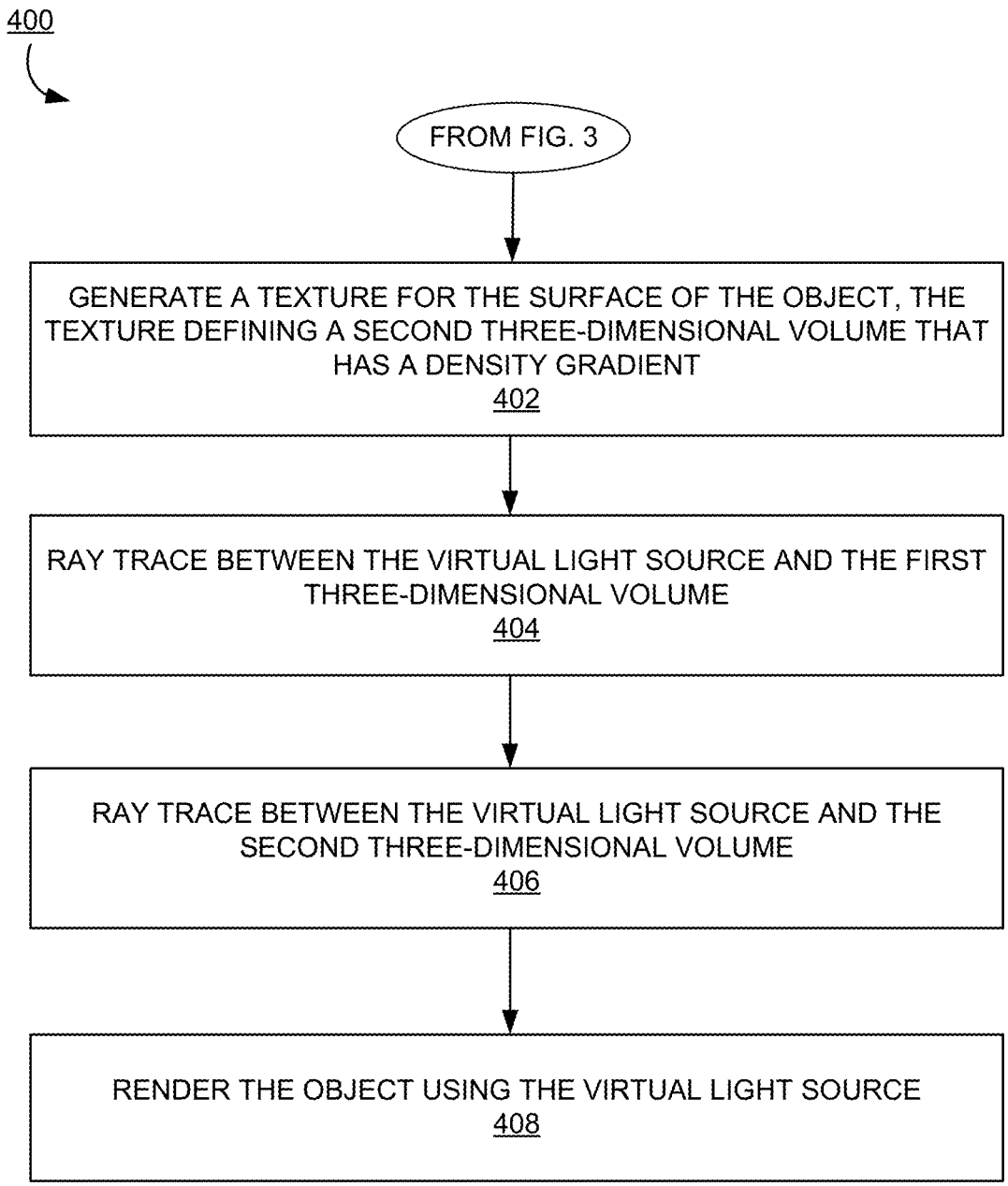
FIG. 4 is a simplified flowchart of a method for rendering a volumetric object with contour volumes according to some embodiments.

FIGS. 3 and 4 illustrate techniques for generating and rendering contour volumes, according to certain embodiments. FIG. 3 is a flowchart of a method for automatically generating contour volumes. The parameters defining the contour volumes are established automatically based on the shape and position of an object to be rendered with respect to the position of a virtual camera and light source(s). Once the contour volumes are generated, an object can be rendered. FIG. 4 is a flowchart of a method for rendering an object with contour volumes. The parameters defining the contour volumes established using the method of FIG. 3 are used to render the contour volumes along with the object.

A. Generating a Contour Volume

FIG. 3 is a simplified flowchart of a method for generating contour volumes according to some embodiments. The method presented in FIG. 3 and described below is intended to be illustrative and non-limiting. It is appreciated that the processing steps may be performed in an order different from that depicted in FIG. 3 and that not all the steps depicted in FIG. 3 need be performed. In certain implementations, the method 300 may be implemented by a computer system, such as the computer system 200 shown in FIG. 2 and/or those shown in FIGS. 15 and 16.

In some embodiments, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At step 302, the computer system receives a polygonal mesh defining a surface of an object. In some embodiments, the computer system 200 depicted in FIG. 2 receives the polygonal mesh from a component coupled to the computer system 200. For example, the object modeling system 1530 of FIG. 15 can generate the polygonal mesh and transmit the polygonal mesh to the computer system 200. Polygons can be used to model the objects and their motion. The polygonal mesh generation process may involve techniques such as non-uniform rational B-splines or NURBS, polygons and subdivision surfaces (or SubDivs), that may be used to describe the shape of the object. A single object may have several different models that describe its shape.

In some implementations, the mesh is initialized by generating a recursively generated B-spline surface, also known as a Catmull-Clark mesh surface. (See Catmull, E. and Clark, J., "Recursively Generated B-Spline Surfaces on Arbitrary Topological Meshes," *Computer-Aided Design* 10, 6 (1978)). The base mesh may then be subdivided into polygons, such as triangles or quadrilaterials, and vertices of the polygons are moved to their limit positions. (See Halstead, M., Kass, M., and Derose, T., "Efficient, Fair Interpolation Using Catmull-Clark Surfaces, *in Proc. SIGGRAPH*, 35-44 (1993)).

At step 304, the computer system (e.g., the contour generation component 204 depicted in FIG. 2) generates contour lines on the surface of the object according to one or more criteria. The contour lines may be generated on the surface of the mesh, or the surface of the object itself. In the following discussion, these terms are used interchangeably.

Figure 5:
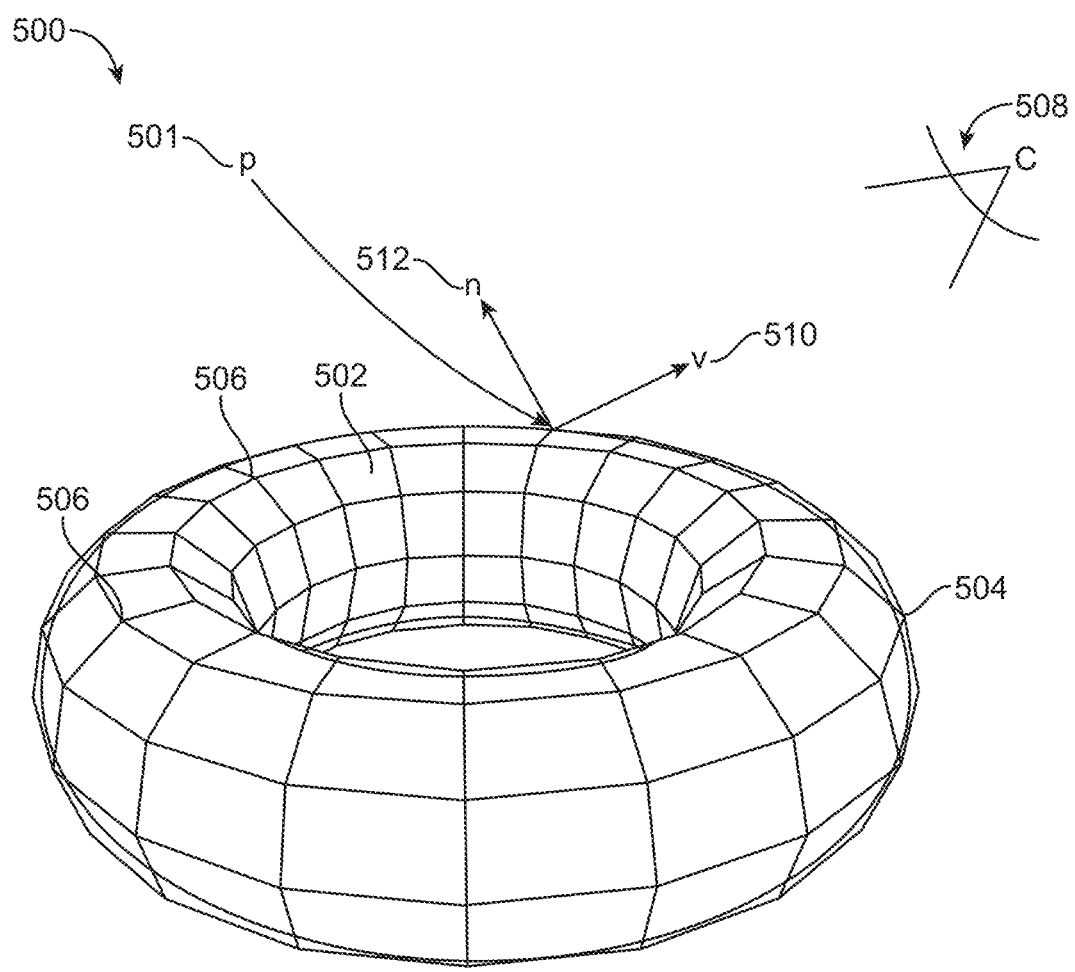
FIG. 5 depicts an image of an object with a polygon mesh illustrating contour generation techniques according to certain embodiments.

In some implementations, the contour lines are silhouette contours and the criteria include whether a given point on the surface of the mesh has a surface normal perpendicular to a viewing vector. Such a geometry corresponds to a point orthogonal to a virtual camera from which the viewing vector may originate. In some aspects, a point p is a vertex of the mesh. The computer system may identify vertices of the mesh. As illustrated in FIG. 5, the computer system may identify an outward surface normal $\vec{n}$ at the identified vertex p. The outward surface normal points outwards from the surface of the object. The computer system identifies a camera center point c corresponding to a virtual camera location, as depicted in FIG. 5. The set of contour lines are generated based on the location of the virtual camera relative to the object. For example, a viewing vector $\vec{v}$ is identified as $\vec{v}=c-p$. The vector $\vec{v}$ points from the point p towards the virtual camera center point c.

If the surface normal $\vec{n}$ is perpendicular to $\vec{v}$ for a given point p, then that point p is selected as a point on a contour line. The computer system may determine whether the surface normal $\vec{n}$ is perpendicular to $\vec{v}$ by computing the dot product of the vector $\vec{v}$ and the normal $\vec{n}$, which provides a measure of how aligned these two vectors are. When $\vec{n}\cdot\vec{v}$ is equal to zero, then $\vec{n}$ is normal to $\vec{v}$. These points at which the dot product is equal to zero represent points at which the camera is orthogonal to the edge of the object.

The computer system may identify this $\vec{n}\cdot\vec{v}$ value at a series of points on the surface of the object (e.g., at each vertex on the mesh). Each vertex will then have an associated value. If the value is equal to zero, then the point is selected for generating the contour line. This process may be repeated for each vertex on the mesh, resulting in a set of selected points. The computer system traces contour lines along the surface of the object by connecting the selected points with respective surface normal perpendiculars to the respective viewing vectors. In other words, the system traces the zero-level set of a function describing the dot product $\vec{n}\cdot\vec{v}$ across the surface of the object. The resulting contour lines separate regions of the object that are facing the camera and regions of the object that are not facing the camera. In other words, the contour lines divide regions that are and are not visible to the camera.

Alternatively, or additionally, the contour lines are Boolean curves and the criteria include identifying points at which the surface of the object self-intersects. The computer system may identify points at which the surface self-intersects by computing a parametric expression for the surface and solving an equation to identify the points of self-intersection, as described in Pekerman et. al, "Self-Intersection Detection and Elimination in Freeform Curves and Surfaces," Computer Aided Design 40, 150-159 (2008).

The silhouette contours and Boolean curves may be used individually or in combination to generate the contour lines. Alternatively, or additionally, contour generation techniques such as mesh contours, ray-tracing contours, or planar map methods may be used. Contour generation techniques are described in further detail in Benard et al., "Computing Smooth Surface Contours with Accurate Topology," *ACM Transactions on Graphics*, Vol. 33, No. 2. (2014).

Figure 7:
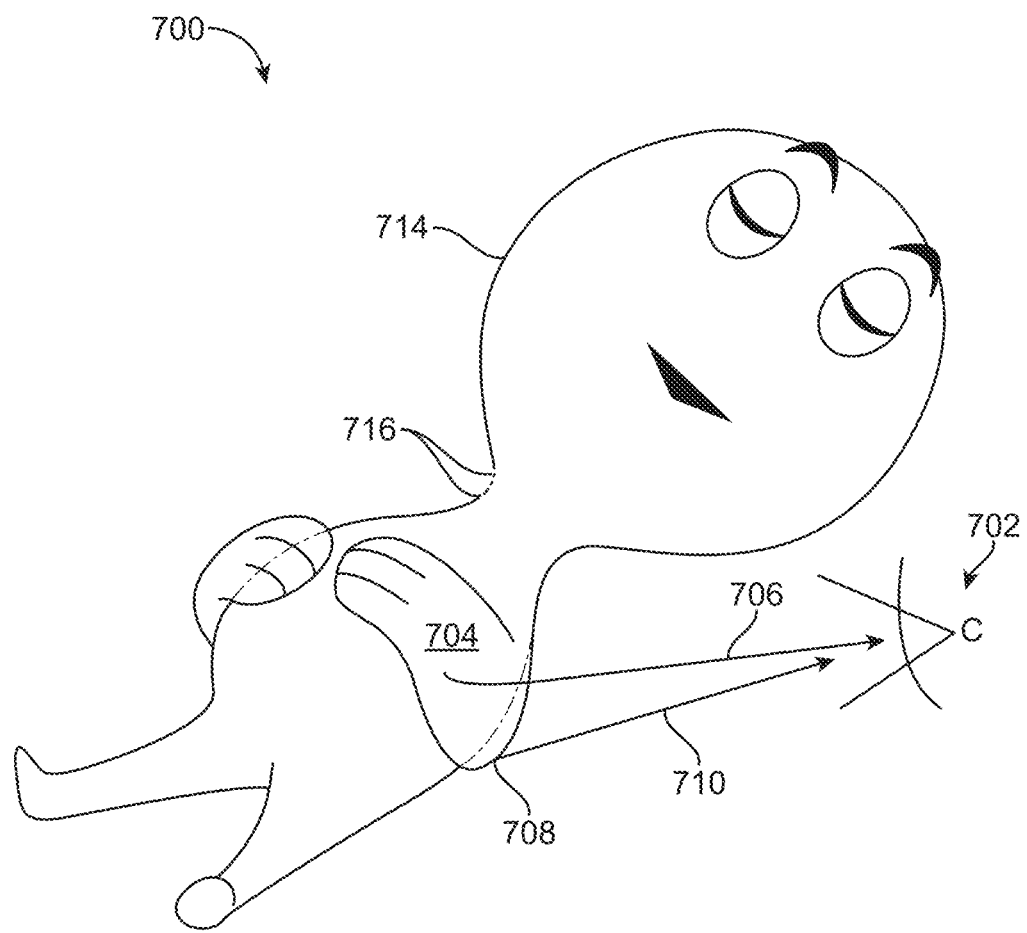
FIG. 7 is an image illustrating visible line generation techniques according to some embodiments.

At step 306, the computer system (e.g., the contour modification component 206 shown in FIG. 2) identifies points of the contour lines that are occluded from a virtual camera. The occluded points can be determined in several different ways. In some implementations, the computing system traces a ray from a point identified as lying on a contour line at step 304. The ray is traced to a virtual camera. The computer system traces a ray from the point identified at step 304 to the virtual camera. The computer system identifies the point as occluded if and when the ray hits the surface of the object. For example, as shown in FIG. 7, point 704 is occluded, as the ray 706 hits a surface, whereas point 708 is not occluded, as the ray 710 does not hit a surface on the way to the virtual camera. A point identified as occluded may be flagged as an occluded point. On the other hand, if the ray corresponding to a particular point proceeds unobstructed to the virtual camera, then this point is considered visible and will be part of a visible line.

In some aspects, each ray is traced from a point offset from the surface of the object. The system shifts the point identified at step 304 from the surface by a specified distance. The specified distance may be some small amount, so that the ray originates just off of the surface of the object. The offset may be along the outer surface normal of the object. The ray is then traced from this offset point to the camera location, and the original point identified at step 304 is flagged as occluded if the ray hits the surface of the object. By biasing the origin of the ray by an offset from the surface of the object, the computer system can avoid having the ray hit the surface due to originating on the surface, and avoid unwanted gaps in the resulting visible lines.

Alternatively, or additionally, identifying points of the contour lines as occluded includes identifying configured surface attributes. For example, an artist may configure parameters establishing how high up an arm of a character a contour line extends. Points may be flagged as occluded based on surface attributes painted by an artist. These parameters are then applied to occlude points corresponding to the upper part of the arm above the configured level.

Figure 8:
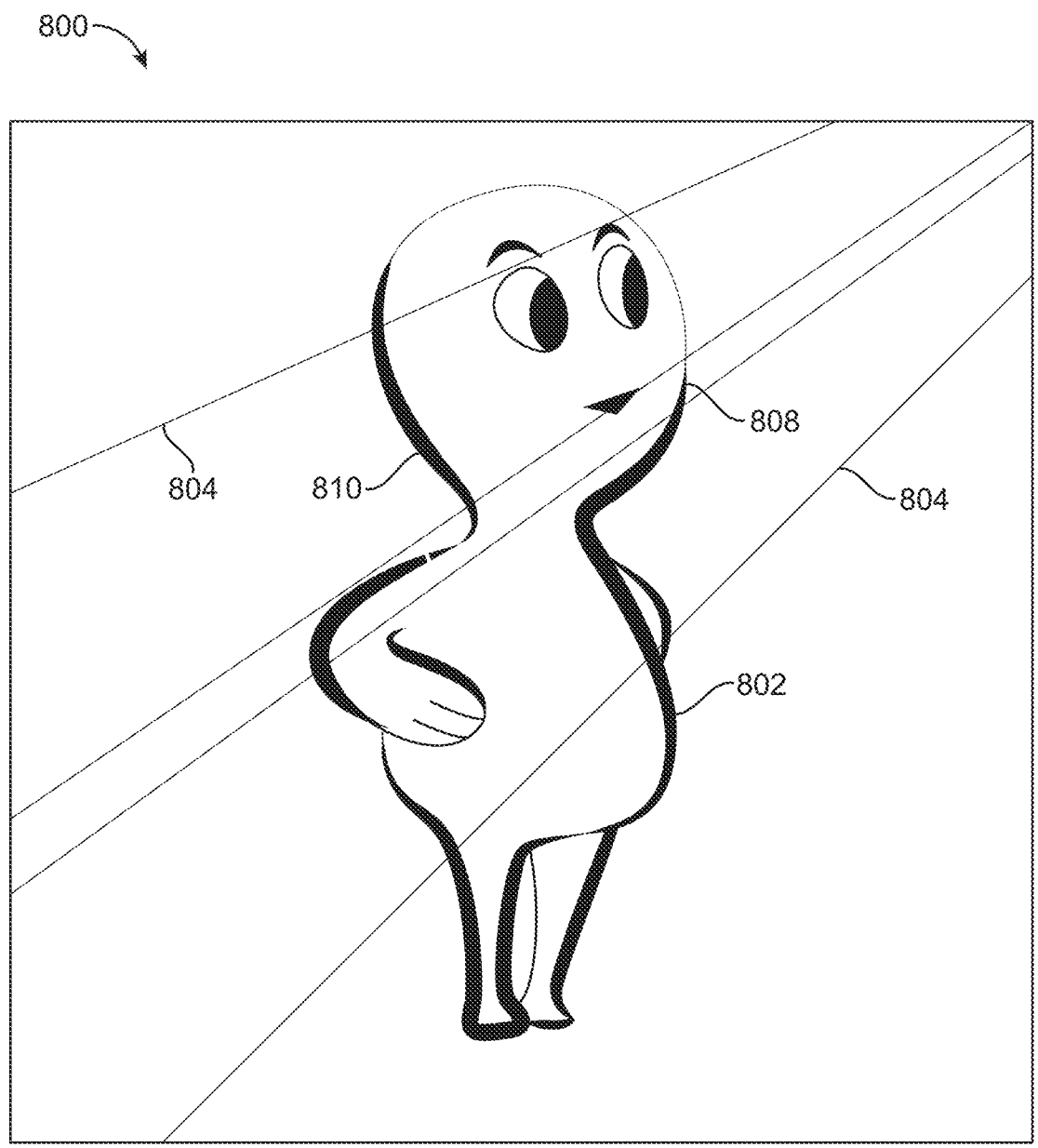
FIG. 8 is an image illustrating visible line modification techniques according to some embodiments.

In some implementations, the occluded points can be modified based on additional illumination sources. A virtual spotlight is established. The flag values marking a particular point as occluded are overwritten if the points are illuminated by the virtual spotlight. For example, as shown in FIG. 8, points 808 and 810 are illuminated by virtual spotlights. These points can have any flag for occlusion overwritten, so that these points are included in the visible lines. In some implementations, multiple virtual spotlights are used in this process.

At step 308, the computer system (e.g., the contour modification component 206 shown in FIG. 2) removes the identified points from the contour lines, thereby generating visible lines. For each point that is flagged at occluded at step 306, the point is removed from the contour line. For example, the dotted line including point 704 shown in FIG. 7 are marked as occluded and excluded from the contour lines. Removing the one or more points from the contour lines generates contour fragments. The contour lines can be split into fragments formed only by points flagged as visible. For example, in FIG. 7, small gaps 716 can be seen in the visible lines 714, fragmenting the surrounding contour lines.

In some implementations, the contour fragments are merged based on certain criteria. For example, the computer system can project the contour fragments onto a focal plane of the virtual camera. A two-dimensional distance between the endpoints of the fragments is determined based on the projection. This determined distance is compared to a specified distance, which may be user configured or automatically selected. The suitable specified distance may vary depending on the size of the object and the desired appearance. The computer system can merge any contour fragments that are within the specified distance of each other. This process can be used to ensure that, even if contour lines are separated in three dimensions, the contour lines are not fragmented in two dimensions. This improves the appearance of the contours, particularly when the contours are tapered as described below with respect to step 310.

At step 310, the computer system (e.g., the ribbon generation component 208 depicted in FIG. 2) generates contour ribbons by extending the visible lines in a first direction relative to the virtual camera. For example, the visible lines are extended in a direction that is lateral relative to the virtual camera. The computer system may duplicate a line segment based on each point along the visible lines. The line segment may be duplicated one or more times along the camera plane (e.g., in a direction substantially lateral to the virtual camera). The duplicated line segments are connected to form a flat ribbon. The contour ribbons may be two-dimensional, expanded versions of the visible lines generated at step 308.

In some implementations, the visible lines are duplicated point-by-point. For each point in the visible line, the point is copied, and the copy is placed in a position according to the first direction. The size of the displacement may correspond to a desired thickness for the ribbon. When repeated across the points in the visible line, this results in two lines. The two lines are then connected to generate a ribbon. In some implementations, each point is connected to a copied point using a polygonal mesh, resulting in a mesh for the contour ribbon.

Figure 10A:
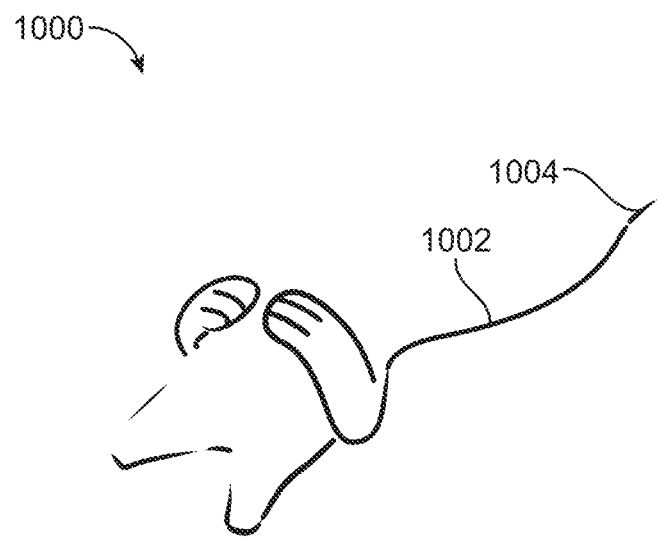
FIGS. 10A and 10B are images illustrating 2D ribbons according to some embodiments.
Figure 10B:
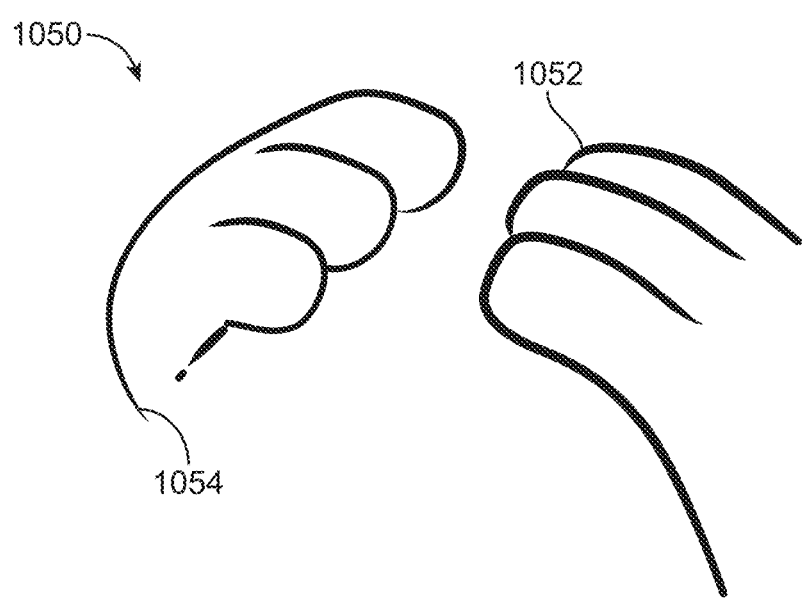

In some embodiments, the computer system tapers ends of the contour ribbons. The length of each of the contour ribbons may be modified based on configured tapering parameters. For example, an illustrator may configure that the end of each contour ribbon, or some of the contour ribbons, taper from the width of the ribbon to a point. A desired falloff may be added along the width of the contour line. Examples of tapered ribbons are shown in FIGS. 10A and 10B.

Figure 11:
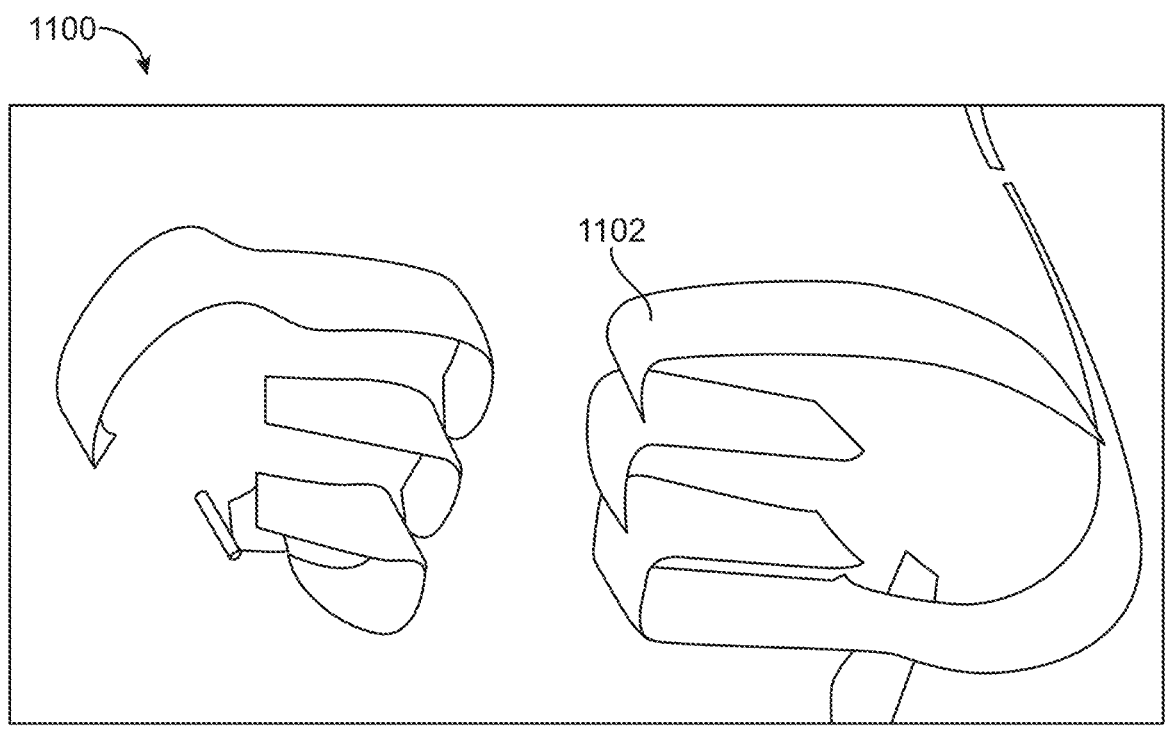
FIG. 11 is an image illustrating extruded ribbons according to some embodiments.

At step 312, the computer system (e.g., the volume generation component 210 depicted in FIG. 2) extrudes faces of the contour ribbons in a second direction relative to the virtual camera. The contour ribbons may, for example, be extruded in a direction perpendicular to the direction in which the contour lines were duplicated at step 310. For example, the contour ribbon can be extruded in depth from the camera. The contour ribbons generated at step 310 may comprise a strip of polygonal mesh. This strip of polygonal mesh is copied and duplicated at a different depth with respect to the camera position. This results in a three-dimensional volume defining the contours, an example of which is illustrated in FIG. 11.

Figure 12:
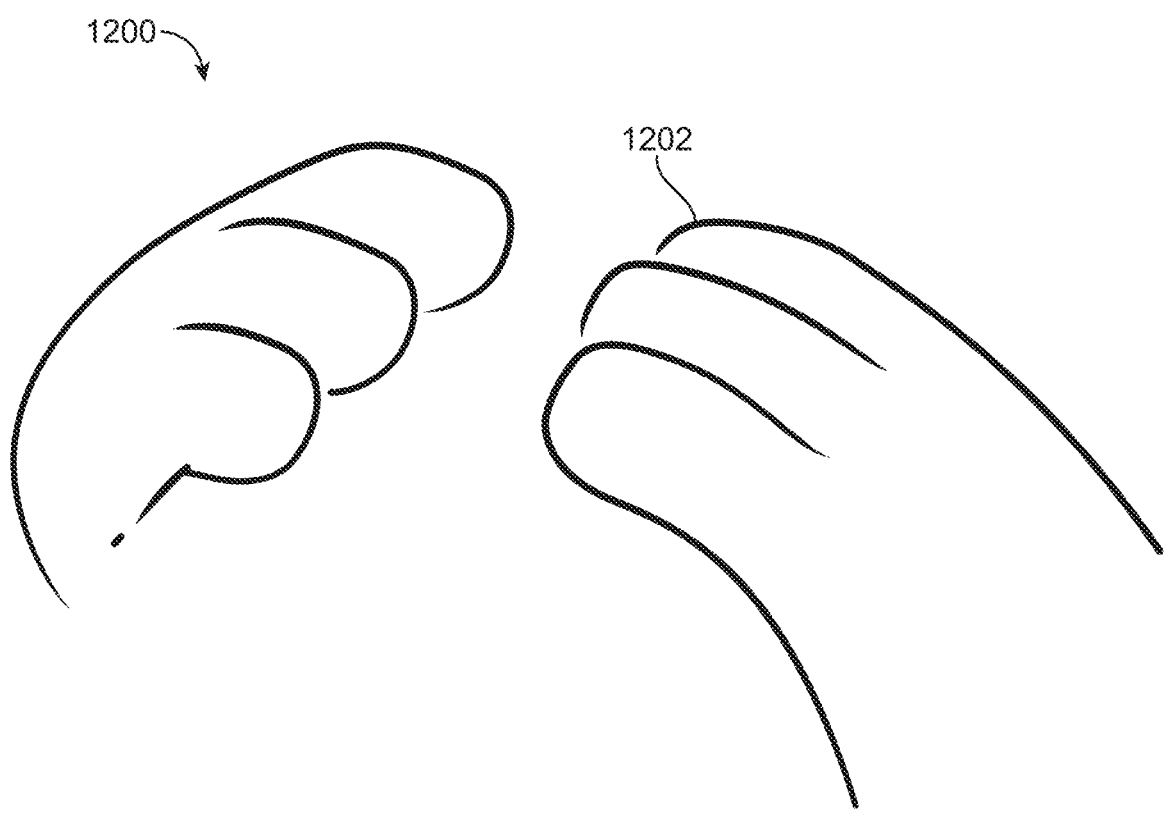
FIG. 12 is an image illustrating contour volumes according to some embodiments.

In some implementations, the contour ribbons are extruded based on density and tapering values that are configured by an artist. The extruded geometry may then be converted into a volumetric density field. The result is a set of volume contours, as illustrated in FIG. 12. These contours can be rendered, along with the object, as described below with respect to FIG. 4.

B. Rendering an Object with Contours

FIG. 4 is a simplified flowchart of a method for rendering a volumetric object with contour volumes according to some embodiments. The method presented in FIG. 4 and described below is intended to be illustrative and non-limiting. It is appreciated that the processing steps may be performed in an order different from that depicted in FIG. 4 and that not all the steps depicted in FIG. 4 need be performed. In certain implementations, the method 400 may be implemented by a computer system, such as the computer system 200 shown in FIG. 2 and/or those shown in FIGS. 15 and 16.

In some embodiments, the method depicted in method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

The method of FIG. 4 renders an object with contour volumes according to both the three-dimensional contour volume generated using the techniques of FIG. 3 (referred to as a first three-dimensional volume) and a volume corresponding to the object itself (referred to as a second three-dimensional volume).

At step 402, the computer system (e.g., the rendering component 212 depicted in FIG. 2) generates a texture for the surface of the object. In some implementations, the computer system generates or obtains a file that represents the texture for the surface of the object (e.g., a bitmap). For example, the texture may be smooth, fuzzy, furry, metallic, and so forth. The computer system may then overlay the texture onto the object (e.g., onto the surface mesh).

In some applications, the three-dimensional volume of the object may further have a density that varies within the object. In some aspects, a density parameter p of the three-dimensional volume of the object is varying such that the three-dimensional volume of the object has a density gradient.

In some embodiments, another set of material parameters is assigned to the first three-dimensional volume corresponding to the contours. For example, the parameters defining the second three-dimensional volume correspond to a fuzzy or cloudy object, and the first three-dimensional volume corresponding to the contours is relatively opaque, so that the contours can define edges of the more foggy object.

At step 404, the computer system (e.g., the rendering component 212 depicted in FIG. 2) ray traces between a virtual light source and the first three-dimensional volume. The ray tracing process can include casting rays into a 3D scene represented by data specifying the first three-dimensional volume. The 3D scene may further include the second three-dimensional volume and any other objects or scenery. The rays can be cast into the 3D scene from pixels of an image plane. For example, the rays can be cast from each pixel or a subset of pixels on an image plane of an image of the 3D scene to be rendered. It should be understood that the number of rays that can be cast can vary. Typically, a larger number of the rays can be cast if many objects are in the 3D scene, and a smaller number of rays can be cast if few objects are in the 3D scene. The rays cast can hit one or more objects in the 3D scene either directly or indirectly on their way back to one or more light sources. In one embodiment, the ray tracing is performed by using Pixar Renderman®. In that embodiment, the number of rays cast can be configured by a user.

In the ray tracing process, each ray is followed from a point in the first three-dimensional volume, and the system tracks if and where the ray interacts with other points before reaching the virtual light source. If the ray strikes an established volume, or if the ray reflects or refracts between multiple points in a volume, that data is represented in the light and color assigned to that point (e.g., to a pixel in the ultimate generated image). The system calculates a color of the contour volume at each point for use in rendering the contour volume. This ray tracing process establishes how to illuminate the volume by identifying how light refracts and reflects from the volume. Techniques for volumetric rendering are described in detail in Fong et al., "Production Volume Rendering," SIGGRAPH 2017.

At step 406, the computer system (e.g., the rendering component 212 depicted in FIG. 2) ray traces between the virtual light source and the second three-dimensional volume. The computer system ray traces to points in the three-dimensional volume corresponding to the surface of the object, as generated at step 402. This is performed in a similar fashion as described above with respect to step 404. Thus, both the contour volumes and the texture of the character are used for illumination.

In some cases, the ray tracing on the first and second three-dimensional volumes is performed substantially simultaneously. For example, a ray is projected, and the ray hits the object volume first then the contour volume, or vice versa. The ray may disperse within the object volume. Some of the dispersed rays will leave the surface, while other dispersed rays will go back into the second volume defining the object, and other rays will hit the contour volumes and then disperse from the contour volumes.

In some implementations, the second-three dimensional volume is fuzzy. A fuzzy volume may have a blurry, soft appearance, such that edges are not well-defined, particularly in overlapping regions. The fuzzy appearance can be a result of transparency, texture, variations in the density gradient, and/or filters. Alternatively or additionally, the fuzzy appearance can be created with a particle approach for foggy objects, cloudy objects, or other types of volumetric fluids such as water. (See, e.g., U.S. Pat. No. 10,282,885, which is incorporated by reference). The second three-dimensional volume defines the object. For example, as shown in FIG. 1, the objects are fuzzy and the lines around the hands define the shape of the object.

At step 408, the computer system renders the object using the virtual light source. The computer system (e.g., the rendering component 212 depicted in FIG. 2) renders the object based on the ray tracing of steps 404 and 406. The system renders the object, with the contour volumes, by converting the color, shape and texture information determined during the ray tracing process into an image.

The methods 300 and 400 described above may be repeated across multiple images which are animated. During animation, the rig of the character can be used to automatically move the character. For each animation frame, the contour volumes are automatically generated. Thus, these techniques can be used to automatically render contours for an animation.

IV. Contour Rendering Pipeline

Figure 13:
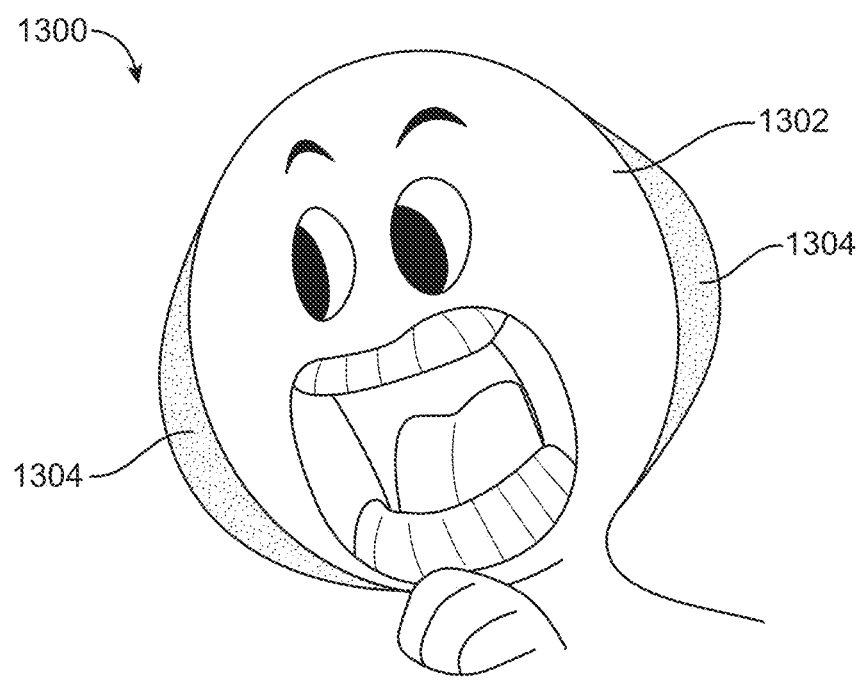
FIG. 13 is an image illustrating halo ribbons according to some embodiments.
Figure 14:
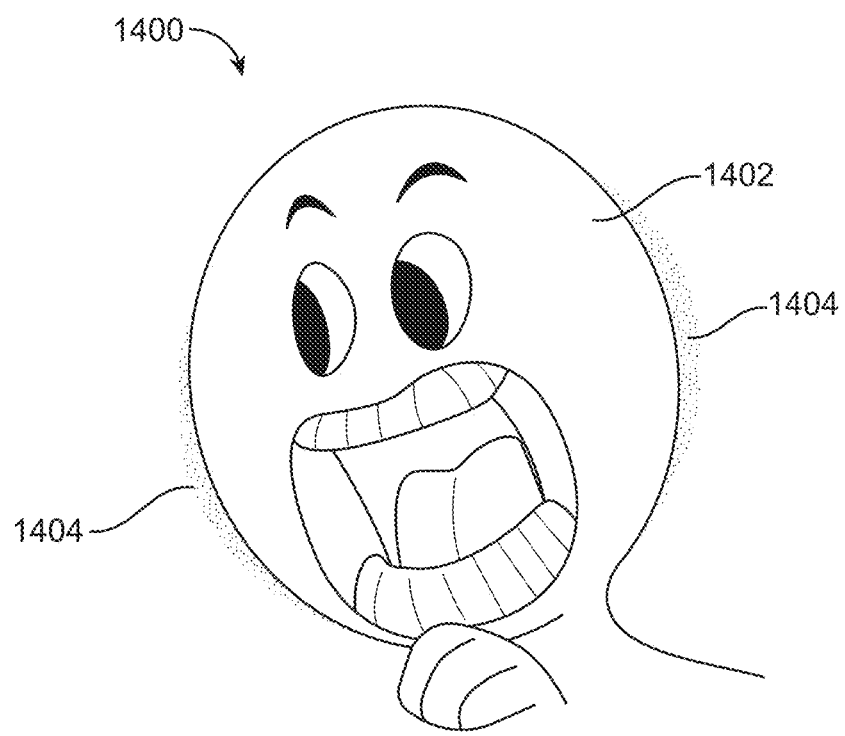
FIG. 14 is an image illustrating a halo volume according to some embodiments.

FIGS. 5-14 show examples illustrating various techniques used in the contour rendering pipeline as described above with respect to FIGS. 3 and 4. In section A, contour line generation techniques are described with respect to the examples shown in FIGS. 5-6B. In section B, techniques for generating visible lines based on contour lines are described with respect to the examples shown in FIGS. 7-9. In section C, examples illustrating contour ribbon generation is described, and in section D, an example illustrating contour volume rendering is described. Section E describes one application of contours for a halo effect as shown in FIGS. 13 and 14.

A. Contour Line Generation

Figure 6A:
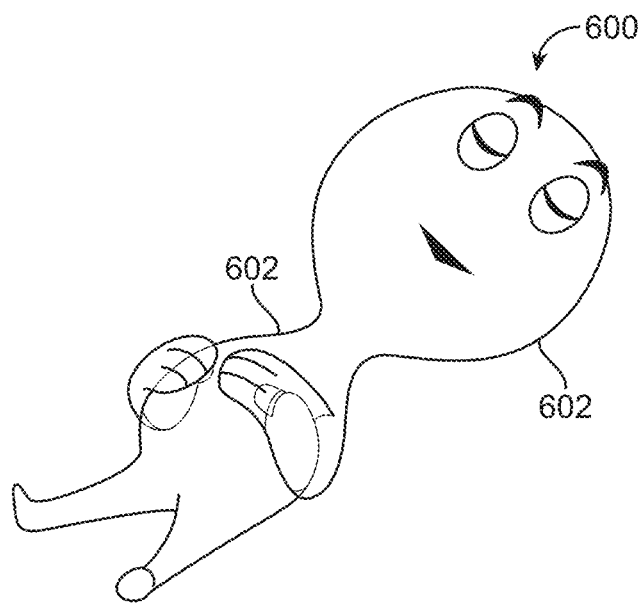
FIGS. 6A and 6B are images illustrating contour line generation according to some embodiments.
Figure 6B:
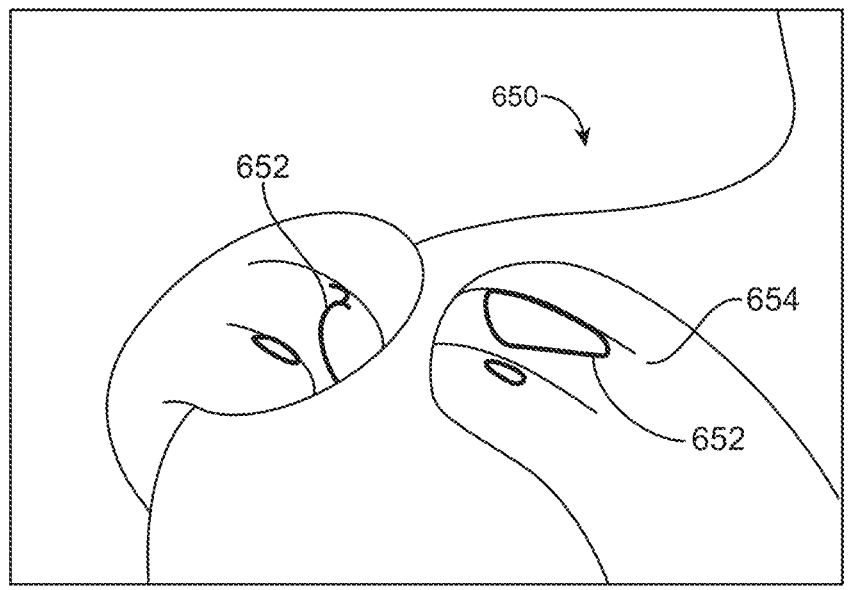

FIGS. 5, 6A, and 6B are images illustrating contour line generation according to some embodiments. As described above with respect to step 304 of FIG. 3, contour lines can be generated on the surface of an object using techniques including silhouette contours and Boolean lines.

FIG. 5 depicts an image 500 of an object 502 with a polygon mesh 504. As described above with respect to FIG. 3, one way to identify a contour line on the surface of the object is by identifying a point p 502 with a surface normal $\vec{n}$ 512 perpendicular to a vector $\vec{v}$ 510 that is directed from point p 502 on the surface of the object towards a virtual camera c 508. In some implementations, p 502 is at a vertex 506 of the mesh 504. Vertices 506 of the polygon mesh 504 are identified. The outward surface normal $\vec{n}$ 512 to point p 501 is determined. A vector $\vec{v}$ 510 is identified, where the vector $\vec{v}$ points in a direction from the point p 501 to a camera location c 508. If the normal vector $\vec{n}$ 512 is normal to the vector $\vec{v}$ 510, then point p 501 is selected for inclusion in a contour line. Each of these selected points p 501 represent points of transition between surfaces of the object 502 that are visible to the camera 508 and surfaces of the object 502 that are not visible to the camera 508.

FIG. 6A depicts an image of an object 600 showing contour generation using silhouette contours 602. The silhouette contours 602 are traced along the surface of the object 604 by connecting points with a surface normal perpendicular to a viewing vector. As described above with respect to FIG. 5 and step 304 of FIG. 3, in some implementations, the silhouette contours 602 are generated by identifying a surface normal to the object at a particular point, establishing a virtual camera, and computing the dot product of the surface normal and a vector directed from the point to the virtual camera. If the dot product is equal to zero, e.g., the normal is perpendicular to the direction of the virtual camera, then the contour includes that point. This will result in contours 602 such as those depicted in FIG. 6, which separate regions of the object facing towards and away from the virtual camera.

FIG. 6B depicts an image of an object 650 showing contour generation using Boolean curves 652. The Boolean curves 652 are curves indicating where the surface 654 of the object 650 self-intersects. On the surface of the object, there may be points where the surface intersects itself. For example, when two fingers move in an animation, one finger may be slightly inside another finger. The system may identify the boundaries of such surface intersections. As described above with respect to step 304 of FIG. 3, in some implementations, the contour lines are generated by identifying such points of self-intersection, which may produce contour lines in the form of Boolean curves 652 such as those depicted in FIG. 6B.

B. Visible Line Generation and Modification

FIGS. 7 and 8 show examples illustrating techniques for generating and modifying visible lines, according to some embodiments. Visible line generation techniques are described with respect to FIG. 7. Visible line modification techniques are described with respect to FIG. 8.

FIG. 7 is an image 700 illustrating techniques for generating visible lines 714 according to some embodiments. As described above with respect to step 306 of FIG. 3, visible lines 714 can be identified based on a virtual camera position C 702. For each point along the visible lines 714, a ray is traced from the point (e.g., points 704 and 708) to the virtual camera 702. If the ray intersects a surface of the object, then the ray is flagged as occluded and will be excluded from the visible lines 714. For example, for point 704, a corresponding ray 706 will pass through the arm of the object. Thus, the point 704 would not be visible from the camera C 702. Accordingly, point 704 and other points along the dotted line through point 704 are marked as occluded and not included in the visible lines 714. On the other hand, the ray 710 extending from point 708 does not hit any portion of the object, as point 708 is on the edge of the object. Thus, point 708 is not marked as occluded and is part of a visible line 714. Gaps 716 are present in the visible lines 714, which can be artifacts of the ray tracing process and may be included in the visible lines via further processing for more aesthetically pleasing visible lines 714. Once the visible lines are generated, in some implementations, the techniques described with respect to FIGS. 8 and/or 9 may be used to further modify or refine the visible lines.

FIG. 8 is an image 800 illustrating use of virtual spotlights to modify visible lines according to some embodiments. As described above with respect to step 306 of FIG. 3, in some implementations, the object is illuminated by one or more virtual spotlights 804 to further refine what points are included in a visible line. This can be achieved by overwriting the contour line visibility flags generated as described above with respect to FIG. 7. Points on the contour lines 802 that are illuminated by the virtual spotlights 804 are marked as visible. Such points include points 808 and 810 shown in FIG. 8. In some implementations, even if these points are not part of the original set of visible lines (e.g., the points are flagged as occluded), these flags can be overwritten based on illuminating the contour lines 802 using one or more additional virtual spotlights.

Alternatively, or additionally, the visible lines may be modified using a defragmentation process to omit small inadvertent gaps in the visible lines.

Figure 9:
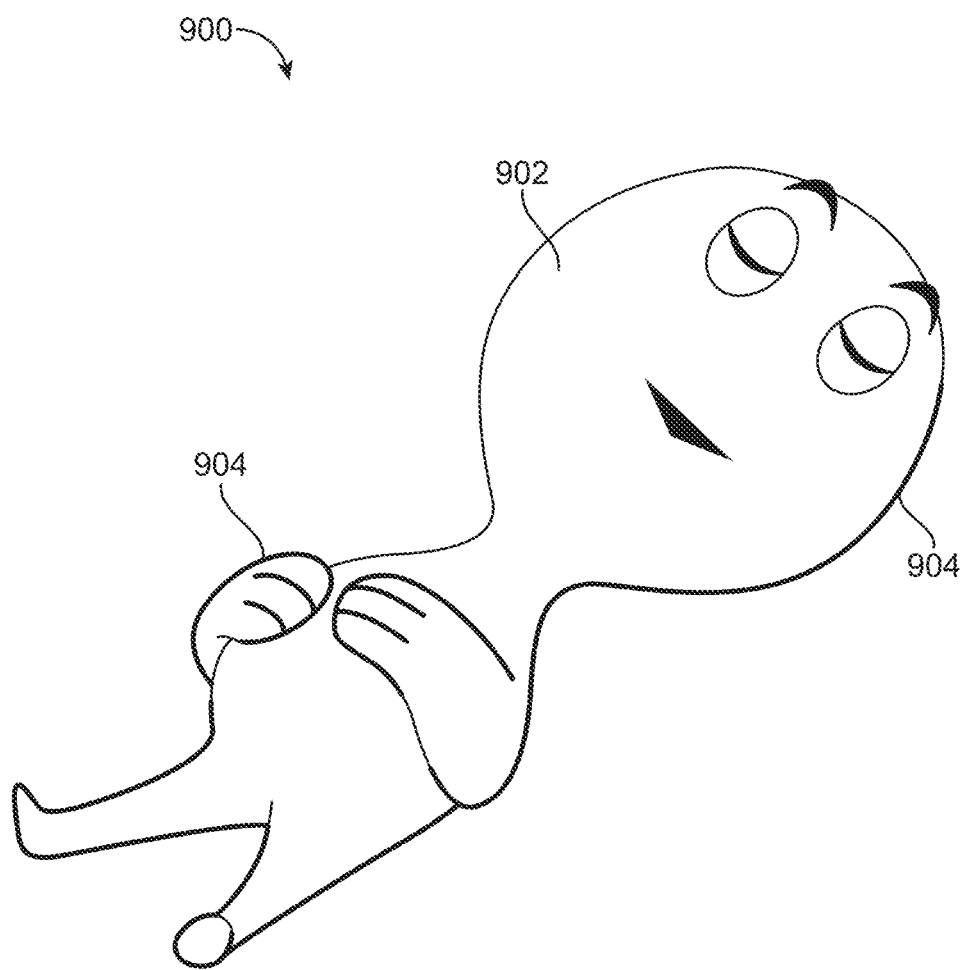
FIG. 9 is an image illustrating defragmented visible lines according to some embodiments.

FIG. 9 is an image 900 illustrating defragmented visible lines 904 according to some embodiments. Visible lines 904 are generated on surfaces of an object 902. The visible lines 904 are on parts of the object 902 that are visible and illuminated, as determined based upon virtual cameras and light sources. For example, as depicted in FIG. 7, certain contour line portions are not visible from a virtual camera. Moreover, as described above with respect to FIG. 3, a defragmentation process may be performed to reduce gaps in the visible lines. For example, starting with a somewhat choppy visible line 714 as shown in FIG. 7, gaps 716 are removed to produce defragmented visible lines 904 on an object 902.

C. Contour Ribbon Generation

FIGS. 10A and 10B are images illustrating contour ribbons according to some embodiments. The image 1000 depicted FIG. 10A shows contour ribbons 1002 defining areas of an object. The contour ribbons 1002 are two-dimensional shapes corresponding to lines extended in a particular direction. For example, the defragmented visible lines 904 shown in FIG. 9 can be duplicated and jointed to produce the contour ribbons 1002 shown in FIG. 10A. Techniques for generating contour ribbons 1002 are described in further detail above with respect to step 310 of FIG. 3. In some implementations, the contour ribbons 1002 are stylized to include tapering ends 1004. FIG. 10B shows a close-up view 1050 of contour ribbons 1052, where the tapered ends 1054 and other features on the hands are shown in more detail.

FIG. 11 is an image 1100 illustrating extruded contour ribbons 1102 according to some embodiments. As described above with respect to step 312 of FIG. 3, contour ribbons such as those depicted in FIG. 10 can be extruded to generate extruded contour ribbons 1102 such as those depicted in FIG. 11. For example, the contour ribbons 1002 depicted in FIG. 10 can be duplicated. The duplicated contour ribbon is placed beside the original contour ribbon 1002, and the contour ribbons can be connected to produce a three-dimensional extruded contour ribbon 1102.

As shown in FIG. 11, the extruded contour ribbon 1102 now has an appreciable thickness, in contrast to the flat contour ribbon 1002 of FIG. 10. The 2D contour ribbons 1002 can be converted into 3D extruded contour ribbons 1102 based on configured density and tapering values. The extruded contour ribbon 1102 may be in the form of a polygonal mesh. The extruded contour ribbons 1102 can specify parameters for generating the final contour volumes as shown in FIG. 12.

D. Contour Volume Rendering

FIG. 12 is an image 1200 illustrating contour volumes 1202 according to some embodiments. The contour volumes 1202 can be generated using extruded contour ribbons 1102 such as those shown in FIG. 11. The contour volumes 1202 define a three-dimensional volume to be rendered according to established parameters. These three-dimensional contour volumes can be rendered along with another volume describing an object, so that the contour volumes 1202 define portions of the object. For example, as shown in FIG. 1, the volumetric characters 102 and 104 are fuzzy objects and body parts such as hands would not be well-defined without the contours 106 to define their edges. While the volumetric characters 102 and 104 are fuzzy objects, the contours 106 have more of a well-defined look. Thus, the contour volumes 1202 can be used to define regions of a fuzzy, transparent, or cloudlike volume. Alternatively, or additionally, contour volumes 1202 can be used for an artistic effect, such as the halo effect depicted in FIGS. 13 and 14.

E. Halo Examples

One example application of an artistic application of contours is creating a halo effect. This can be achieved by generating halo ribbons as depicted in FIG. 13 which are used to render halo volumes as shown in FIG. 14.

FIG. 13 is an image 1300 illustrating halo ribbons 1304 on an object 1302 according to some embodiments. The halo ribbons 1304 are a type of contour ribbons that can be used to generate contour volumes, such as those depicted in FIG. 14, that provide a stylistic effect. As described above with respect to FIG. 3, contour ribbons can be generated based on a contour line such as a defragmented visible line. Halo ribbons 1304 are a specific example of such contour ribbons that are placed around the head of an object to produce an artistic halo effect. In this example, the halo ribbons 1304 are placed around the head of the object to generate volumetric contours around the head as shown in FIG. 14. As described with respect to FIG. 3, ribbons extruded from a contour line can be used to generate a final contour volume.

FIG. 14 is an image 1400 illustrating halo volumes 1404 according to some embodiments. The halo volumes 1404 are one example of contour volumes that create a halo effect. In this example, the halo volumes 1404 are positioned around the sides of the head of the object 1402 relative to the virtual camera position to produce a halo effect for stylistic purposes. The halo volumes 1404 can be generated from halo ribbons 1304 as depicted in FIG. 13.

As described above with respect to FIG. 3, an extruded contour ribbon can be generated by extruding a contour ribbon in 3D. This 3D extruded contour ribbon can then be used to render a contour volume along with the object itself as described above with respect to FIG. 4. A halo volume 1404 is one application of such a rendered contour, where the contour is rendered around the head of the object to appear like a halo. In some implementations, the halo volumes 1404 have additional and more vibrant colors than the rest of the characters V. Computer Systems FIG. 15 is a simplified block diagram of system 1500 for creating computer graphics imagery (CGI) and computer-aided animation that may implement or incorporate various embodiments. In this example, system 1500 can include one or more design computers 1510, object library 1520, one or more object modeling systems 1530, one or more object articulation systems 1540, one or more object animation systems 1550, one or more object simulation systems 1560, and one or more object rendering systems 1570. Any of the systems 1530-1570 may be invoked by or used directly by a user of the one or more design computers 1510 and/or automatically invoked by or used by one or more processes associated with the one or more design computers 1510. Any of the elements of system 1500 can include hardware and/or software elements configured for specific functions.

The one or more design computers 1510 can include hardware and software elements configured for designing CGI and assisting with computer-aided animation. Each of the one or more design computers 1510 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1510 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1510 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1510 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1510 acting as an animator may employ one or more systems or tools to specify motion and position of one or more objects over time to produce an animation.

Object library 1520 can include elements configured for storing and accessing information related to objects used by the one or more design computers 1510 during the various stages of a production process to produce CGI and animation. Some examples of object library 1520 can include a file, a database, or other storage devices and mechanisms. Object library 1520 may be locally accessible to the one or more design computers 1510 or hosted by one or more external computer systems.

Some examples of information stored in object library 1520 can include an object itself, metadata, object geometry, object topology, rigging, control data, animation data, animation cues, simulation data, texture data, lighting data, shader code, or the like. An object stored in object library 1520 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1530 can include hardware and/or software elements configured for modeling one or more objects. Modeling can include the creating, sculpting, and editing of an object. In various embodiments, the one or more object modeling systems 1530 may be configured to generated a model to include a description of the shape of an object. The one or more object modeling systems 1530 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1530 may further generate model data (e.g., 2D and 3D model data) for use by other elements of system 1500 or that can be stored in object library 1520. The one or more object modeling systems 1530 may be configured to allow a user to associate additional information, metadata, color, lighting, rigging, controls, or the like, with all or a portion of the generated model data.

The one or more object articulation systems 1540 can include hardware and/or software elements configured to articulating one or more computer-generated objects. Articulation can include the building or creation of rigs, the rigging of an object, and the editing of rigging. In various embodiments, the one or more articulation systems 1540 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1540 may further generate articulation data (e.g., data associated with controls or animations variables) for use by other elements of system 1500 or that can be stored in object library 1520. The one or more object articulation systems 1540 may be configured to allow a user to associate additional information, metadata, color, lighting, rigging, controls, or the like, with all or a portion of the generated articulation data.

The one or more object animation systems 1550 can include hardware and/or software elements configured for animating one or more computer-generated objects. Animation can include the specification of motion and position of an object over time. The one or more object animation systems 1550 may be invoked by or used directly by a user of the one or more design computers 1510 and/or automatically invoked by or used by one or more processes associated with the one or more design computers 1510.

In various embodiments, the one or more animation systems 1550 may be configured to enable users to manipulate controls or animation variables or utilized character rigging to specify one or more key frames of animation sequence. The one or more animation systems 1550 generate intermediary frames based on the one or more key frames. In some embodiments, the one or more animation systems 1550 may be configured to enable users to specify animation cues, paths, or the like according to one or more predefined sequences. The one or more animation systems 1550 generate frames of the animation based on the animation cues or paths. In further embodiments, the one or more animation systems 1550 may be configured to enable users to define animations using one or more animation languages, morphs, deformations, or the like.

The one or more object animations systems 1550 may further generate animation data (e.g., inputs associated with controls or animations variables) for use by other elements of system 1500 or that can be stored in object library 1520. The one or more object animations systems 1550 may be configured to allow a user to associate additional information, metadata, color, lighting, rigging, controls, or the like, with all or a portion of the generated animation data.

The one or more object simulation systems 1560 can include hardware and/or software elements configured for simulating one or more computer-generated objects. Simulation can include determining motion and position of an object over time in response to one or more simulated forces or conditions. The one or more object simulation systems 1560 may be invoked by or used directly by a user of the one or more design computers 1510 and/or automatically invoked by or used by one or more processes associated with the one or more design computers 1510.

In various embodiments, the one or more object simulation systems 1560 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1560 may be used to simulate the behavior of objects, such as hair, fur, and cloth, in response to a physics model and/or animation of one or more characters and objects within a computer-generated scene.

The one or more object simulation systems 1560 may further generate simulation data (e.g., motion and position of an object over time) for use by other elements of system 1500 or that can be stored in object library 1520. The generated simulation data may be combined with or used in addition to animation data generated by the one or more object animation systems 1550. The one or more object simulation systems 1560 may be configured to allow a user to associate additional information, metadata, color, lighting, rigging, controls, or the like, with all or a portion of the generated simulation data.

The one or more object rendering systems 1570 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1570 may be invoked by or used directly by a user of the one or more design computers 1510 and/or automatically invoked by or used by one or more processes associated with the one or more design computers 1510. One example of a software program embodied as the one or more object rendering systems 1570 can include PhotoRealistic RenderMan, or PRMan, produced by Pixar Animations Studios of Emeryville, Calif.

In various embodiments, the one or more object rendering systems 1570 can be configured to render one or more objects to produce one or more computer-generated images or a set of images over time that provide an animation. The one or more object rendering systems 1570 may generate digital images or raster graphics images.

In various embodiments, a rendered image can be understood in terms of a number of visible features. Some examples of visible features that may be considered by the one or more object rendering systems 1570 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1570 may further render images (e.g., motion and position of an object over time) for use by other elements of system 1500 or that can be stored in object library 1520. The one or more object rendering systems 1570 may be configured to allow a user to associate additional information or metadata with all or a portion of the rendered image.

FIG. 16 is a block diagram of computer system 1600. FIG. 16 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1600 and any of its components or subsystems can include hardware and/or software elements configured for performing methods described herein.

Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication The one or more data processors or central processing units (CPUs) 1605 can execute logic or program code or for providing application-specific functionality. Some examples of CPU(s) 1605 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1610 can execute logic or program code associated with graphics or for providing graphics-specific functionality. GPUs 1610 may include any conventional graphics processing unit, such as those provided by conventional video cards. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like.

Memory subsystem 1615 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1615 can include data and program code 1640.

Storage subsystem 1620 can also store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of data and program code 1640 may be stored using storage subsystem 1620.

The one or more input/output (I/O) interfaces 1625 can perform I/O operations. One or more input devices 1650 and/or one or more output devices 1655 may be communicatively coupled to the one or more I/O interfaces 1625. The one or more input devices 1650 can receive information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can output information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements. A display device or monitor may be used with computer system 1600 and can include hardware and/or software elements configured for displaying information.

Communications interface 1630 can perform communications operations, including sending and receiving data. Some examples of communications interface 1630 may include a network communications interface (e.g. Ethernet, Wi-Fi, etc.). For example, communications interface 1630 may be coupled to communications network/external bus 1660, such as a computer network, a USB hub, or the like. A computer system can include a plurality of the same components or subsystems, e.g., connected together by communications interface 1630 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1600 may also include one or more applications (e.g., software components or functions) to be executed by a processor to execute, perform, or otherwise implement techniques disclosed herein. These applications may be embodied as data and program code 1640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1615 and/or storage subsystem 1620.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for performing animation, the method comprising performing, by a computer system:
   receiving a polygonal mesh defining a surface of an object;
   generating contour lines on the surface of the object according to one or more criteria;
   identifying one or more points of the contour lines that are occluded from a virtual camera;
   removing the one or more points from the contour lines, thereby generating visible lines;
   generating contour ribbons by extending the visible lines in a first direction relative to the virtual camera;
   extruding faces of the contour ribbons in a second direction relative to the virtual camera, thereby generating a first three-dimensional volume;
   generating a texture for the surface of the object, the texture defining a second three-dimensional volume that has a density gradient; and
   rendering, using a virtual light source, the object by ray tracing between the virtual light source and the first three-dimensional volume and by ray tracing between the virtual light source and the second three-dimensional volume.

2. The method of claim 1, wherein the contour lines are generated based on a location of the virtual camera relative to the object.

3. The method of claim 1, wherein identifying a first point as occluded includes:
   shifting the first point from the surface by a specified distance;
   tracing a ray from the first point to the virtual camera; and
   identifying the first point as occluded when the ray hits the surface of the object.

4. The method of claim 1, wherein removing the one or more points from the contour lines generates contour fragments, the method further comprising:
   projecting the contour fragments onto a focal plane of the virtual camera; and
   merging any contour fragments that are within a specified distance of each other.

5. The method of claim 1, wherein the first direction is lateral relative to the virtual camera, and wherein the second direction defines a depth relative to the virtual camera.

6. The method of claim 1, further comprising tapering ends of the contour ribbons.

7. The method of claim 1, wherein generating the contour lines includes one or more of:
   identifying points on the surface of the object that have a surface normal perpendicular to a viewing vector; and
   identifying points of self-intersection of the surface of the object.

8. The method of claim 1, wherein:
   the second three-dimensional volume is fuzzy; and
   the first three-dimensional volume defines a shape of the second three-dimensional volume.

9. The method of claim 1, wherein identifying the one or more points of the contour lines as occluded includes identifying configured surface attributes.

10. The method of claim 1, wherein the object is a character and wherein the first three-dimensional volume defines body parts of the character.

11. A system for performing animation, the system comprising one or more processors configured to:
   receive a polygonal mesh defining a surface of an object;
   generate contour lines on the surface of the object according to one or more criteria;
   identify one or more points of the contour lines that are occluded from a virtual camera;
   remove the one or more points from the contour lines, thereby generating visible lines;
   generate contour ribbons by extending the visible lines in a first direction relative to the virtual camera;
   extrude faces of the contour ribbons in a second direction relative to the virtual camera, thereby generating a first three-dimensional volume;
   generate a texture for the surface of the object, the texture defining a second three-dimensional volume that has a density gradient; and
   render, using a virtual light source, the object by ray tracing between the virtual light source and the first three-dimensional volume and by ray tracing between the virtual light source and the second three-dimensional volume.

12. The system of claim 11, wherein the contour lines are generated based on a location of the virtual camera relative to the object.

13. The system of claim 11, wherein identifying a first point as occluded includes:
   shifting the first point from the surface by a specified distance;
   tracing a ray from the first point to the virtual camera; and
   identifying the first point as occluded when the ray hits the surface of the object.

14. The system of claim 11, wherein removing the one or more points from the contour lines generates contour fragments, the processors further configured to:
   project the contour fragments onto a focal plane of the virtual camera; and
   merge any contour fragments that are within a specified distance of each other.

15. The system of claim 11, wherein the first direction is lateral relative to the virtual camera, and wherein the second direction defines a depth relative to the virtual camera.

16. The system of claim 11, wherein the processors are further configured to taper ends of the contour ribbons.

17. The system of claim 11, wherein generating the contour lines includes one or more of:
   identifying points on the surface of the object that have a surface normal perpendicular to a viewing vector; and
   identifying points of self-intersection of the surface of the object.

18. The system of claim 11, wherein:
   the second three-dimensional volume is fuzzy; and
   the first three-dimensional volume defines a shape of the second three-dimensional volume.

19. The system of claim 11, wherein identifying the one or more points of the contour lines as occluded includes identifying configured surface attributes.

20. The system of claim 11, wherein the object is a character and wherein the first three-dimensional volume defines body parts of the character.

* * * * *